US012762399B2

(12) United States Patent
Wang et al.

(10) Patent No.: US 12,762,399 B2
(45) Date of Patent: Oct. 13, 2026

(54) GENERATING LABELED TRAINING DATA USING A PRE-TRAINED LANGUAGE MODEL NEURAL NETWORK

(71) Applicant: Google LLC, Mountain View, CA (US)

(72) Inventors: Zirui Wang, San Francisco, CA (US); Wei Yu, Palo Alto, CA (US); Orhan Firat, Mountain View, CA (US); Yuan Cao, Mountain View, CA (US)

(73) Assignee: Google LLC, Mountain View, CA (US)

( * ) Notice: Subject to any disclaimer, the term of this patent is extended or adjusted under 35 U.S.C. 154(b) by 906 days.

(21) Appl. No.: 18/082,934

(22) Filed: Dec. 16, 2022

(65) Prior Publication Data

US 2023/0196105 A1 Jun. 22, 2023

Related U.S. Application Data

(60) Provisional application No. 63/291,296, filed on Dec. 17, 2021.

(51) Int. Cl.

| | |
|---|---|
| ***G06N 3/08*** | (2023.01) |
| ***G06N 3/044*** | (2023.01) |
| ***G06N 3/0455*** | (2023.01) |
| ***G06N 3/088*** | (2023.01) |
| ***G06N 3/09*** | (2023.01) |

(52) U.S. Cl.

CPC .................................... *G06N 3/08* (2013.01)

(58) Field of Classification Search

CPC ........ G06N 3/08; G06N 3/0455; G06N 3/088; G06N 3/09; G06N 3/044; G06N 3/0895; G06N 3/091; G06N 3/092; G06N 3/094; G06N 3/096; G06N 3/098; G06N 3/0985; G06N 3/045; G06N 3/0442

See application file for complete search history.

(56) References Cited

U.S. PATENT DOCUMENTS

2022/0383206 A1* 12/2022 Luong .................. G06N 3/0895
2022/0414137 A1* 12/2022 Sewak ................ G06F 16/3346

OTHER PUBLICATIONS

Chang et al., Jointly Improving Language Understanding and Generation with Quality-Weighted Weak Supervision of Automatic Labeling, Feb. 6, 2021, https://arxiv.org/pdf/2102.03551 (Year: 2021).*
Beltagy et al., Sci Bert: A Pretrained Language Model for Scientific Text, Sep. 10, 2019, https://arxiv.org/pdf/1903.10676 (Year: 2019).*

(Continued)

*Primary Examiner* — Kakali Chaki
*Assistant Examiner* — Molly C Sippel
(74) *Attorney, Agent, or Firm* — Fish & Richardson P.C.

(57) ABSTRACT

Methods, systems, and apparatus, including computer programs encoded on computer storage media, for generating labeled training data using a pre-trained language model neural network. In particular, the language model neural network can generate the text input in a new labeled training example from an input sequence that includes (i) one or more context inputs and (ii) a text label that identifies the ground truth category for the new labeled training example.

20 Claims, 5 Drawing Sheets

(56) References Cited

OTHER PUBLICATIONS

Shaikh, S., Daudpota, S. M., Imran, A. S., & Kastrati, Z. Towards Improved Classification Accuracy on Highly Imbalanced Text Dataset Using Deep Neural Language Models. Jan. 19, 2021. Applied Sciences, 11(2), 869. https://doi.org/10.3390/app11020869 (Year: 2021).*

Chen et al., Revisiting Self-Training for Few-Shot Learning of Language Model, Oct. 4, 2021, https://arxiv.org/pdf/2110.01256 (Year: 2021).*

Edwards et al., Guiding Generative Language Models for Data Augmentation in Few-Shot Text Classification, Nov. 17, 2021, https://arxiv.org/pdf/2111.09064v1 (Year: 2021).*

Oscar Sainz and German Rigau. 2021. Ask2Transformers: Zero-Shot Domain labelling with Pretrained Language Models. In Proceedings of the 11th Global Wordnet Conference, pp. 44-52, University of South Africa (UNISA). Global Wordnet Association. (Year: 2021).*

Meng et al., Text Classification Using Label Names Only: A Language Model Self-Training Approach, Oct. 14, 2020, https://arxiv.org/pdf/2010.07245 (Year: 2020).*

Adiwardana et al., "Towards a Human-like Open-Domain Chatbot," CoRR, Submitted on Feb. 27, 2020, arXiv:2001.09977v3, 38 pages.

Anaby-Tavor et al., "Not Enough Data? Deep Learning to the Rescue!," CoRR, Submitted on Nov. 27, 2019, arXiv:1911.03118v2, 9 pages.

Brown et al., "Language Models are Few-Shot Learners," CoRR, Submitted on Jul. 22, 2020, arXiv:2005.14165v4, 75 pages.

Carlini et al., "Extracting Training Data from Large Language Models," CoRR, Submitted on Jun. 15, 2021, arXiv:2012.07805v2, 19 pages.

Devlin et al., "BERT: Pre-training of Deep Bidirectional Transformers for Language Understanding," CoRR, Submitted Oct. 11, 2018, arXiv:1810.04805v1, 14 pages.

Hoffmann et al., "Training Compute-Optimal Large Language Models," CoRR, Submitted on Mar. 29, 2022, arxiv:2203.15556v1, 36 pages.

Juuti et al., "A little goes a long way: Improving toxic language classification despite data scarcity," Findings of the Association for Computational Linguistics: EMNLP 2020, Nov. 16-20, 2020, 2991-3009.

Kumar et al., "Data Augmentation using Pre-trained Transformer Models," CoRR, Submitted Jan. 31, 2021, arXiv:2003.02245v2, 9 pages.

Lee et al., "Neural Data Augmentation via Example Extrapolation," CoRR, Submitted Feb. 2, 2021, arXiv:2102.01335v1, 14 pages.

Liu et al., "ROBERTa: A Robustly Optimized BERT Pretraining Approach," CoRR, Submitted Jul. 26, 2019, arXiv:1907.11692v1, 13 pages.

Maas et al., "Learning Word Vectors for Sentiment Analysis," Proceedings of the 49th Annual Meeting of the Association for Computational Linguistics: Human Language Technologies, Jun. 19-24, 2011, 142-150.

Papanikolaou et al., DARE: Data Augmented Relation Extraction with GPT-2, CoRR, Submitted Apr. 6, 2020, arXiv:2004.13845v1, 9 pages.

Petroni et al., "Language Models as Knowledge Bases?," CoRR, Submitted Sep. 4, 2019, arXiv:1909.01066v2, 11 pages.

Radford et al., "Language Models are Unsupervised Multitask Learners," OpenAI blog, 2019, 1(8):9.

Rae et al., "Scaling Language Models: Methods, Analysis & Insights from Training Gopher," CoRR, Submitted on Dec. 8, 2021, arXiv:2112.11446v1, 118 pages.

Raffel et al., "Exploring the Limits of Transfer Learning with a Unified Text-to-Text Transformer," CoRR, Submitted on Oct. 24, 2019, arXiv:1910.10683v2, 53 pages.

Roberts et al., "How Much Knowledge Can You Pack Into the Parameters of a Language Model?," Proceedings of the 2020 Conference on Empirical Methods in Natural Language Processing (EMNLP), Nov. 16-20, 2020, 5418-5426.

Schick et al., "It's Not Just Size That Matters: Small Language Models Are Also Few-Shot Learners," CoRR, Submitted on Sep. 15, 2020, arXiv:2009.07118v1, 11 pages.

Tam et al., "Improving and Simplifying Pattern Exploiting Training," CoRR, Submitted Sep. 28, 2021, arXiv:2103.11955v3, 12 pages.

Wang et al., "Language Models are Open Knowledge Graphs," CoRR, Submitted Oct. 22, 2020, arXiv:2010.11967v1, 30 pages.

Wang et al., "SuperGLUE: A Stickier Benchmark for General-Purpose Language Understanding Systems," CoRR, Submitted Jul. 12, 2019, arXiv:1905.00537v2, 30 pages.

Wang et al., "Towards Zero-Label Language Learning," CoRR, Submitted Sep. 19, 2021, arXiv:2109.09193v1, 14 pages.

Wei et al., "EDA: Easy Data Augmentation Techniques for Boosting Performance on Text Classification Tasks," CoRR, Submitted Aug. 25, 2019, arXiv:1901.11196v2, 9 pages.

Xie et al., "Unsupervised Data Augmentation for Consistency Training," CoRR, Submitted Sep. 30, 2019, arXiv:1904.12848v4, 19 pages.

Yang et al., "XLNet: Generalized Autoregressive Pretraining for Language Understanding," CoRR, Submitted Jun. 19, 2019, arXiv:1906.08237v1, 18 pages.

Yu et al., "QANet: Combining Local Convolution with Global Self-Attention for Reading Comprehension," CoRR, Submitted Apr. 23, 2018, arXiv:1804.09541v1, 16 pages.

Zhang et al., "Character-level Convolutional Networks for Text Classification," CoRR, Submitted Sep. 10, 2015, arXiv:1509.01626v2, 9 pages.

* cited by examiner

GENERATING LABELED TRAINING DATA USING A PRE-TRAINED LANGUAGE MODEL NEURAL NETWORK

CROSS-REFERENCE TO RELATED APPLICATION

This application claims priority to U.S. Provisional Application No. 63/291,296, filed on Dec. 17, 2021. The disclosure of the prior application is considered part of and is incorporated by reference in the disclosure of this application.

BACKGROUND

This specification relates to processing inputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

SUMMARY

This specification describes a system implemented as computer programs on one or more computers in one or more locations that generates labeled training data for a text classification task using a pre-trained language model neural network. That is, the system uses a language model neural network that is pre-trained and that has not been trained specifically to generate training data for the text classification task.

After generating the labeled training data, the system trains another neural network to perform the text classification task using the labeled training data, e.g., using only the labeled training data or by augmenting an existing training data set for the text classification task with the labeled training data.

The subject matter described in this specification can be implemented in particular embodiments so as to realize one or more of the following advantages.

Unlabeled text data is plentiful and can be readily obtainable to train powerful language models in an unsupervised fashion. However, labeled training data for certain text classification tasks may be limited or otherwise difficult to obtain because generating this data requires manual annotation from expert users.

The described techniques leverage these powerful pre-trained language models to automatically generate labeled training data for a text classification task. Specifically, the described training data creation procedure leverages fewshot prompts that are provided to a pretrained language model to synthesize high-quality training data without any real human annotations. The described techniques can be used for zero-label learning for the text classification task, i.e., by training task-specific models solely on the synthetic data generated by the described training data creation procedure, in order to achieve better or comparable results to strong baseline models trained on human-labeled data. Furthermore, when mixed with human-labeled data, the described procedure serves as a highly effective data augmentation procedure to increase the quality of the training data set, resulting in significantly better performance on downstream text classification tasks relative to the state of the art. By removing the requirement to use manually-labeled data or by reducing the amount of manually-labeled data that is required to obtain a high-performing trained model for a given task, the described techniques greatly reduce the time and computational cost required to generate the high-performing trained model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that uses a pre-trained language model neural network to generate auto-labeled training examples for a text classification task.

Figure 1:
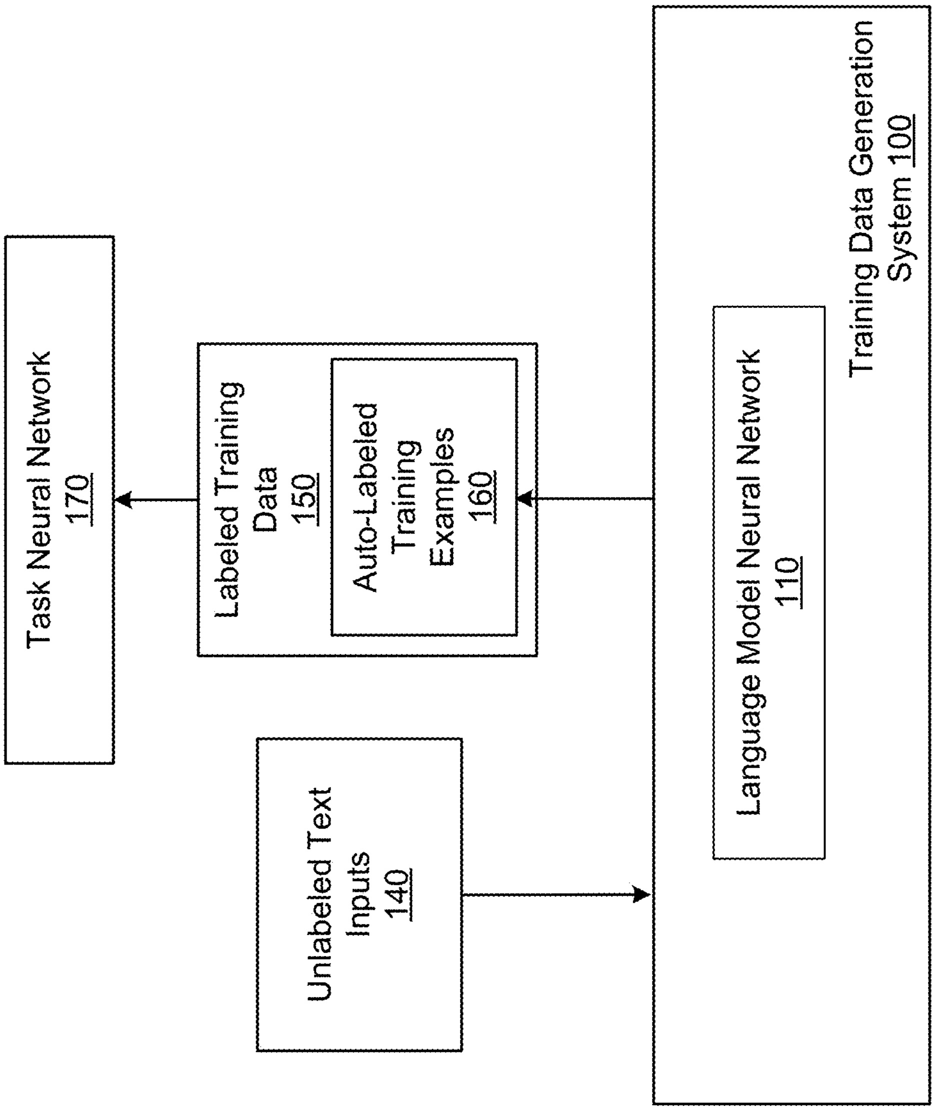
FIG. 1 is a diagram of an example training data generation system.

FIG. 1 is a diagram of an example training data generation system 100. The training data generation system 100 is an example of a system implemented as computer programs on one or more computers in one or more locations, in which the systems, components, and techniques described below can be implemented.

This system 100 generates labeled training data 150 for a text classification task from unlabeled text inputs 140 for the text classification task. The labeled training data 150 includes a set of training examples, with each training example including a training text input for the text classification task and a "label," i.e., a corresponding target output for the training text input that identifies a category from a plurality of categories for the text classification task to which the training text input belongs.

The text classification task can be any natural language processing or understanding task that requires receiving an input sequence of text tokens and processing the input sequence of text tokens to generate an output that classifies the input sequence into one of a plurality of categories. Examples of such tasks include a topic classification task that classifies an input sequence as being about one of a plurality of topics, an entailment classification task that, given a premise sequence and a hypothesis sequence, requires predicting whether the premise entails the hypothesis (entailment), contradicts the hypothesis (contradiction), or neither (neutral), a textual similarity classification task that requires classifying two or more input sequences into one of a plurality of similarity categories that each represent a different level of similarity between the input sequences, a sentiment classification task that classifies an input sequence into one of a plurality of sentiment categories that each represent different sentiments, a grammaticality classification task that requires classifying whether an input sequence is a grammatical sentence in some natural language, and so on.

To generate the labeled training data 150, the system 100 obtains a plurality of unlabeled text inputs 140 for the text classification task, with each unlabeled text input including a respective sequence of text tokens from a vocabulary of text tokens.

The tokens in the vocabulary can be any appropriate text tokens, e.g., words, word pieces, punctuation marks, and so on that represent elements of text in one or more natural languages and, optionally, numbers and other text symbols that are found in a corpus of text. For example, the system 100 can tokenize a given sequence of words by applying a tokenizer, e.g., the SentencePiece tokenizer or another tokenizer, to divide the sequence into tokens from the vocabulary.

The text inputs are referred to as "unlabeled" because the system 100 does not have access to or does not make use of any data that identifies which of the categories any given text input should belong to.

The system 100 generates, using the unlabeled text inputs 140, a plurality of auto-labeled training examples 160 for the text classification task.

Each auto-labeled training example 160 includes a respective text input and identifies a respective target category from the plurality of categories for the respective text input.

To generate a given training example 160, the system 100 selects, as context text inputs, one or more of the unlabeled text inputs and generates an input sequence of text tokens that includes (i) the one or more context text inputs and (ii) a text label that identifies a respective one of the plurality of categories.

The system 100 then processes, using a pre-trained language model neural network 110, the input sequence to generate an output sequence of text tokens.

The system 100 then generates an auto-labeled training example 160 that (i) includes, as the respective text input in the training example, the output sequence generated by the pre-trained language model neural network and (ii) identifies, as the respective target category for the output sequence, the respective category identified by the text label in the input sequence.

Thus, the training examples 160 are "auto-labeled" because the system 100 generates the training examples without any external information about which is the correct category for the text input in any given training example. This is in contrast to "manually-labeled" training examples, which are labeled using external information, e.g., a user input, that specifies which category is the correct category for a given training input.

Thus, the outputs generated by the pre-trained language model 110 are used to generate the inputs in the training examples 160, while the corresponding targets for the training examples are generated based on which category was identified in the input to the pre-trained language model 110. Accordingly, the training inputs in the training examples can be generated solely by providing data identifying which label the input should correspond to as part of an input to the language model 110 and without needing to re-train or fine-tune the language model 110 on any task-specific data for the text classification task.

The system 100 can repeat the above steps, modifying which context inputs are selected and which category the label data identifies, until some criteria are satisfied, e.g., until a threshold number of training examples have been generated for each category.

The language model 110 can have any appropriate neural network architecture that allows the model to map an input sequence to an output sequence. For example, the language model 110 can have an encoder-decoder Transformer-based architecture. As another example, the language model 110 can have a decoder-only Transformer-based architecture, where the input sequence is provided as a "prompt" to the neural network 110.

More specifically, the language model neural network 110 can be an auto-regressive neural network that auto-regressively generates the output sequence of text tokens by generating each particular text token in the output sequence conditioned on a current input sequence that includes (i) the input sequence followed by (ii) any text tokens that precede the particular text token in the output sequence.

More specifically, to generate a particular text token, the neural network 110 can process the current input sequence to generate a score distribution, e.g., a probability distribution, that assigns a respective score, e.g., a respective probability, to each token in the vocabulary of text tokens. The neural network 110 can then select, as the particular text token, a text token from the vocabulary using the score distribution. For example, the neural network 110 can greedily select the highest-scoring token or can sample, e.g., using top-k sampling, nucleus sampling or another sampling technique, a token from the distribution.

As a particular example, the pre-trained language model neural network 110 can be an auto-regressive Transformer-based neural network that includes a plurality of layers that each apply a self-attention operation. The neural network 110 can have any of a variety of Transformer-based neural network architectures. Examples of such architectures include those described in J. Hoffmann, S. Borgeaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv:2203.15556, 2022; J. W. Rae, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glaese, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I. Babuschkin, A. Clark, D. de Las Casas, A. Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CoRR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoory Kulshreshtha, Gaurav Nemade, Yifeng Lu, and Quoc V. Le. Towards a human-like open-domain chatbot. CoRR, abs/

2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

Prior to using the language model neural network 110 to generate training examples, the neural network 110 is pre-trained e.g., by the system 100 or by one or more other systems.

In particular, the system 100 or the other system(s) pre-trains the language model neural network 110 on a language modeling task, e.g., a task that requires predicting, given a current sequence of text tokens, the next token that follows the current sequence in the training data. Equivalently, the language modeling task can require, for each given unlabeled text sequence in a training data set, a text sequence that followed the given unlabeled text sequence in a corresponding document. As a particular example, the language model neural network 110 can be pre-trained on a maximum-likelihood objective on a large dataset of text, e.g., text that is publically available from the Internet or another text corpus.

Because the text used for the pre-training does not need to be labeled and because large quantities of unlabeled text are readily available, e.g., from the Internet or in other large-scale text corpuses, the language model neural network 110 can be pre-trained on a large set of training data and the pre-trained language model neural network 110 can therefore encode a large amount of text-based knowledge. The system 100 can then leverage this text-based knowledge to generate a large amount of high-quality auto-labelled training examples 160.

The system 100 or another system can then train a task neural network 170 to perform the text classification task on the labeled training data 150 that includes the auto-labeled training examples 160. Optionally, the labeled training data 150 can also include additional manually-labeled training examples.

The task neural network 170 can have any appropriate neural network architecture that allows the model to map an input sequence to a classification output. For example, the model can have an encoder-only Transformer-based architecture. As another example, the model can be a recurrent neural network (RNN).

This training is described in more detail below with reference to FIGS. 2-5.

Figure 2:
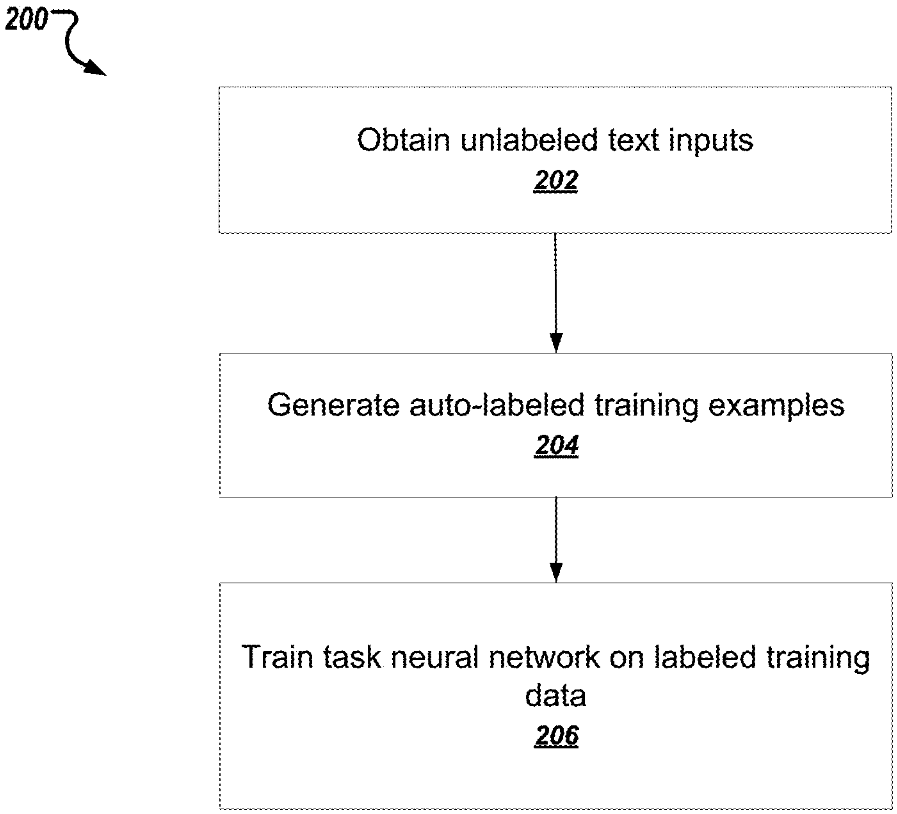
FIG. 2 is a flow diagram of an example process for generating labeled training data for a text classification task.

FIG. 2 is a flow diagram of an example process 200 for generating labeled training data for a text classification task. For convenience, the process 200 will be described as being performed by a system of one or more computers located in one or more locations. For example, a training data generation system, e.g., the training data generation system 100 depicted in FIG. 1, appropriately programmed in accordance with this specification, can perform the process 200.

As described above, the text classification task can be any task that requires classifying a text input as belonging to one or more categories from a set of multiple categories.

The system obtains a plurality of unlabeled text inputs for the text classification task (step 202). Each unlabeled text input includes a respective sequence of text tokens from the vocabulary of text tokens. The text inputs are referred to as "unlabeled" because the system does not have access to or does not make use of any data that identifies which of the categories for the task any given text input should belong to.

The system generates a plurality of auto-labeled training examples for the text classification task from the unlabeled text inputs (204). Each auto-labeled training example includes a respective text input and identifies a respective target category from the plurality of categories for the respective text input, i.e., identifies a respective target category to which the text input belongs.

In particular, the system generates each auto-labeled training example using a language model neural network and, more specifically, can generate the auto-labeled training example without having access to any labeled training examples for the text classification task.

Generating an auto-labeled training example using the language model neural network is described in more detail below with reference to FIG. 3.

The system can continue generating auto-labeled training examples using the language model neural network until some termination criteria are satisfied, e.g., until a threshold number of training examples have been generated for each category.

The system then trains a task neural network to perform the text classification task on labeled training data that includes the auto-labeled training examples (step 206).

In particular, in some implementations, the labeled training data includes only the auto-labeled training examples and the system effectively trains the task neural network to perform the text classification task without access to any manually-labeled examples for the task.

In some other implementations, the labeled training data includes both the auto-labeled training examples and a set of manually-labelled training examples for the task. Thus, the system uses the auto-labeled training examples to augment an existing set of training data for the task in order to improve the effectiveness of the training.

The task neural network can have any appropriate neural network architecture that allows the model to map an input sequence to a classification output. For example, the model can have an encoder-only Transformer-based architecture. As another example, the model can be a recurrent neural network (RNN).

In some implementations, the system trains the task neural network on the training data that includes the auto-labeled training examples from scratch.

In some other implementations, the system or another training system has, prior to the training on the labeled training data that includes the auto-labeled training examples, pre-trained the task neural network on unsupervised training data. Thus, the system uses the labeled training data that includes the auto-labeled training examples to fine-tune the task neural network to perform the text classification task. The system can pre-train the task neural network using any appropriate unsupervised learning objective, e.g., a masked language modeling objective, e.g., the BERT loss.

Because the auto-labeled training examples are generated without access to any labels for the text classification task, the training examples may be "noisy," i.e., include a non-negligible amount of examples where the label in the training example is not the most accurate label for the input in the training example. In some implementations, to account for this, the system trains the task neural network on the training data using noisy label annealing to filter out noisy examples during training.

Training using noisy label annealing is described in more detail below with reference to FIG. 5.

Figure 3:
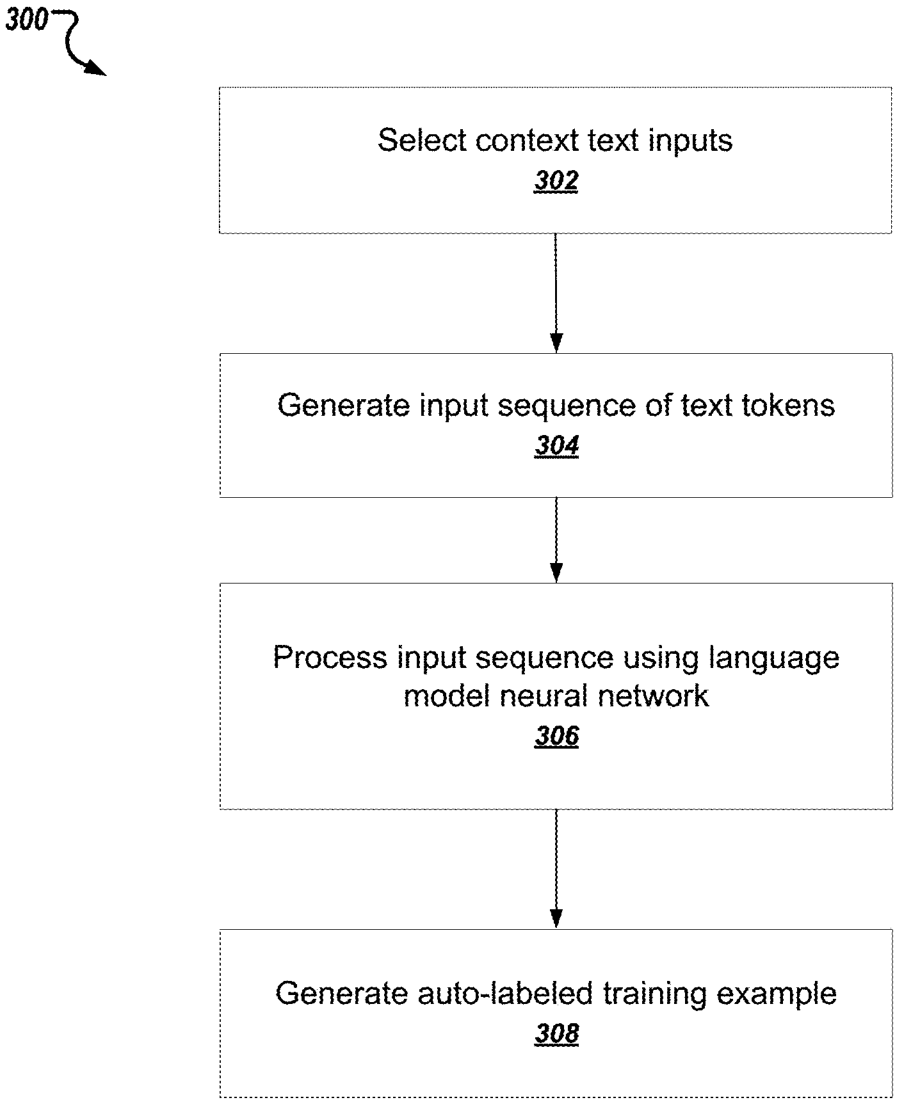
FIG. 3 is a flow diagram of an example process for generating an auto-labeled training example.

FIG. 3 is a flow diagram of an example process 300 for generating an auto-labeled training example for a target category. For convenience, the process 300 will be described as being performed by a system of one or more computers located in one or more locations. For example, a training data generation system, e.g., the training data generation system 100 depicted in FIG. 1, appropriately programmed in accordance with this specification, can perform the process 300.

The system selects, as context text inputs, one or more of the unlabeled text inputs in the set of unlabeled text inputs for the task (step 302). For example, the system can randomly sample a fixed number of the unlabeled text inputs for the task. As another example, the system can randomly sample unlabeled text inputs until a total length of the sampled unlabeled text inputs, i.e., the total number of text tokens in all of the sampled unlabeled text inputs, reaches a maximum length allocated to the context text inputs in input sequences for the language model neural network.

The system generates an input sequence of text tokens that includes (i) the one or more context text inputs and (ii) a text label that identifies a respective one of the plurality of categories (step 304). For example, the system can generate the text label by applying a task-specific transformation function that maps data identifying the respective category to a natural language description. For example, the system can receive as input data that maps, for each category for the task, an alpha-numeric identifier for the category to a natural language description.

Optionally, the input sequence can also include a natural language description of the text classification task.

Examples of input sequences are shown below with reference to FIG. 4.

Thus, the input sequence of text tokens includes unlabeled context text inputs of the type that would be present in inputs for the text classification task and a text label that identifies the target category for which the training example is being generated.

For example, the system can randomly select a target category for each iteration of the process 300 or can perform iterations of the process 300 until a threshold number of training examples have been generated for the current target category before moving on to the next category in the set of categories for the task.

The system processes, using the pre-trained language model neural network, the input sequence to generate an output sequence of text tokens (step 306).

The system generates an auto-labeled training example that (i) includes, as the respective text input in the training example, the output sequence generated by the pre-trained language model neural network and (ii) identifies, as the respective target category for the output sequence, the respective category identified by the text label in the input sequence (step 308).

Thus, as a result of the pre-training and because of the content of the input sequence, the output sequence that is generated by the language model neural network is a text sequence of the type that is required for the text classification task and that belongs to the target category identified in the input sequence.

Figure 4:
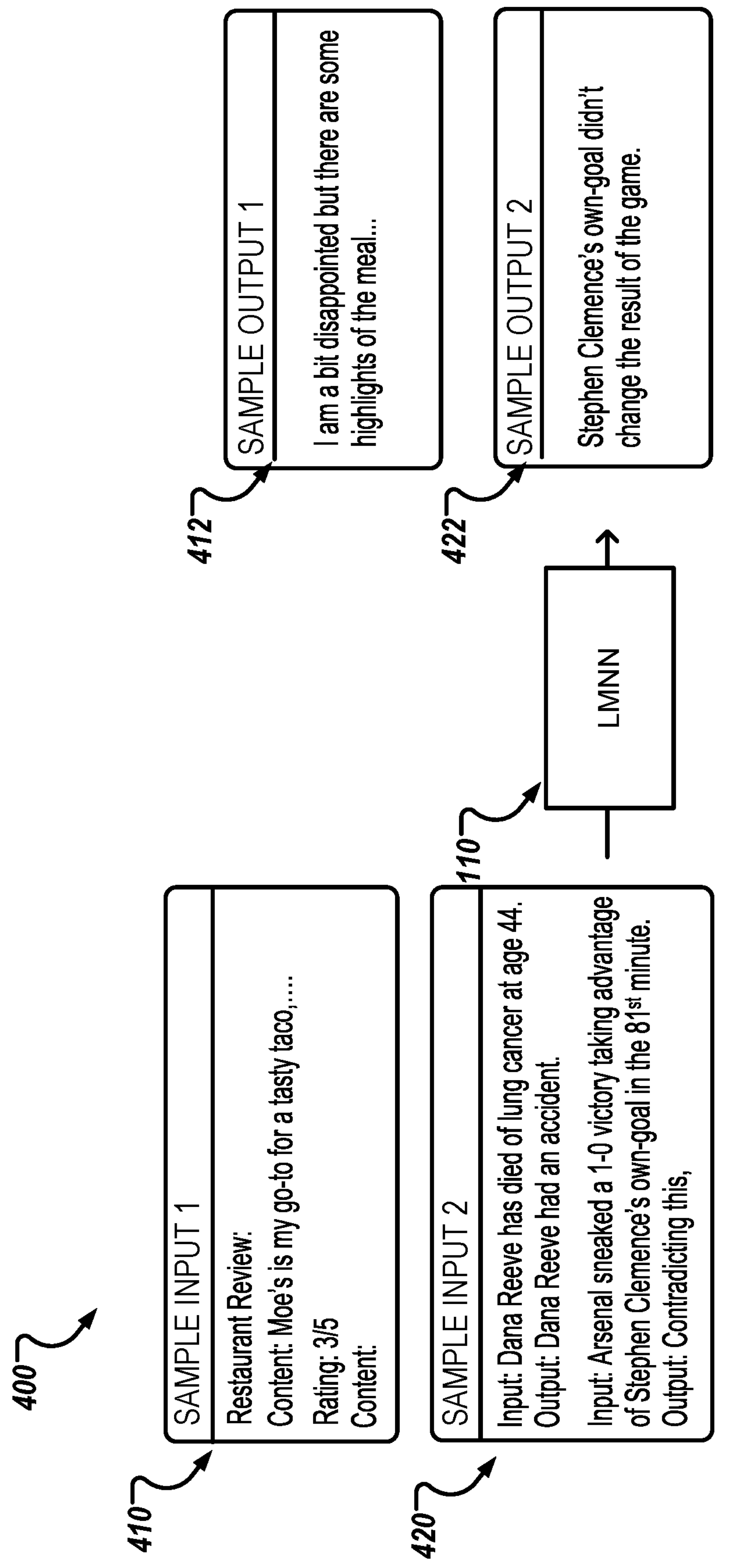
FIG. 4 shows example input sequences and output sequences.

FIG. 4 shows examples 400 of input sequences and corresponding output sequences for a variety of text classification tasks.

In particular, FIG. 4 shows three sample input sequences 410, 420, and 430 and respective sample output sequences 412, 422, and 432 for the three sample input sequences.

The first input sequence 410 is for a text classification task that requires assigning a rating on a scale of 1 to 5 to a restaurant review.

In the example of FIG. 4, the input sequences for this task start with a natural language description of the inputs for the task ("Restaurant Review"), followed by one or more context restaurant reviews (each preceded by the tag "Content"). For example, the input sequence 410 includes a context restaurant review that starts with "Moe's is my go-to for a tasty taco . . . ". As can be seen from FIG. 4, the input sequence 410 does not include a rating for the context restaurant reviews.

The last context restaurant review in the input sequence 410 is followed by a text label that describes a target category and a "Content:" tag that prompts the neural network 110 to start generating a new restaurant review. As can be seen from FIG. 4, the target rating is "3/5."

The neural network 110 processes the input sequence 410 to generate the output sequence 412, i.e., a restaurant review that would correspond to a 3/5 rating, that starts with "I am a bit disappointed but there are some highlights of the meal . . . ".

As can be seen from the second input sequence 420, the neural network 110 can also be used for tasks where each input for the task relates to a corresponding other text segments. That is, the task requires relating the text input for the task to a different text segment.

In particular, the second input sequence 420 is for a textual entailment task, where the output identifies whether the text input is entailed by, contradicted by, or neither, a specified other text sequence.

Thus, the second input sequence 420 includes a context text sequence with an input and an output text, but no entailment classification between the two. The second input sequence 420 also includes a first specified other text sequence ("Arsenal sneaked . . . ") and a label describing the "contradicts" category ("Contradicting this,") and the output sequence 422 is a sequence ("Stephen Clemence's . . . ") that is predicted to contradict the first sequence.

The third input sequence 430 is for a "connected sentences" task where the output is a classification of the connection between, i.e., the relationship between, two sequences.

Figure 5:
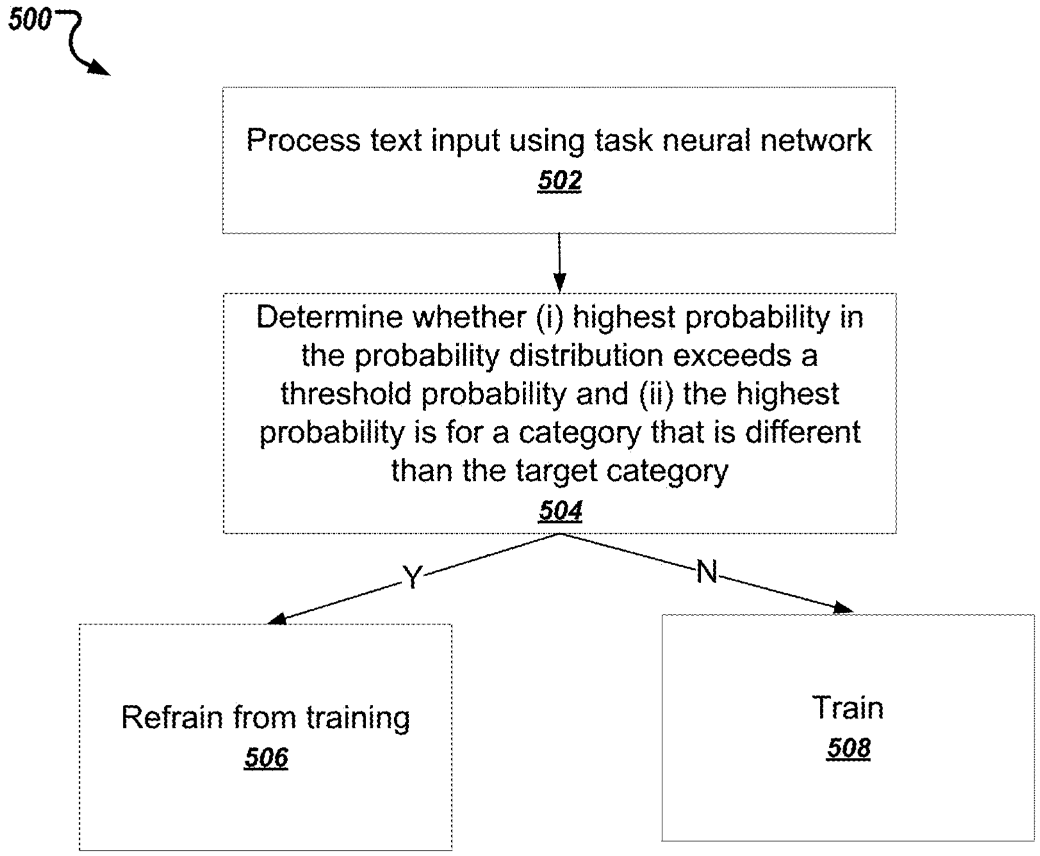
FIG. 5 is a flow diagram of an example process for training the task neural network.

FIG. 5 is a flow diagram of an example process 500 for training with noisy label annealing. For convenience, the process 500 will be described as being performed by a system of one or more computers located in one or more locations. For example, a training data generation system, e.g., the training data generation system 100 depicted in FIG. 1, appropriately programmed in accordance with this specification, can perform the process 500.

In particular, the system can train the task neural network over a sequence of a plurality of training steps. At each training step, the system samples a batch of one or more training examples and trains the neural network on the sampled batch to update the parameters of the task neural network. When the sampled batch at a given training step includes one or more auto-labeled training examples, i.e., when an auto-labeled training example is sampled at the training step, the system can perform an iteration of the process 500 for each sampled auto-labeled training example to determine whether to train on the sampled auto-labeled training example.

In particular, the system processes the text input in the sampled auto-labeled training example using the task neural network to generate a probability distribution over the plurality of categories (step 502).

The system determines whether (i) a highest probability in the probability distribution exceeds a threshold probability for the training step and (ii) the highest probability is for a category that is different than the target category identified in the sampled auto-labeled training example (step 504).

If both (i) the highest probability in the probability distribution exceeds the threshold probability for the training step and (ii) the highest probability is for a category that is different than the target category identified in the sampled auto-labeled training example, the system refrains from training the task neural network on the sampled auto-labeled training example at the training step (step 506). That is, the system determines that the training example is likely "noisy" and that the neural network would not benefit from being trained on it.

Optionally, if the system refrains from training on a training example, the system can remove the sampled auto-labeled training example from the labeled training data such that the sampled auto-labeled training example is not used at any subsequent training steps.

In some implementations, each training step has the same threshold probability.

In some other implementations, however, training steps that are earlier in the sequence have higher probabilities than training steps that are later in the sequence.

For example, the system can set the initial threshold to a fixed value, e.g., 0.9 and then gradually anneal it to 1/K, K where K is the number of categories for the task. This can account for the fact that the neural network is less accurate at the early stage of the training process, i.e., by requiring a very high confidence level to filter examples. As the neural network becomes better trained, the system can safely decrease the "bar."

If (i) the highest probability in the probability distribution does not exceed the threshold probability for the training step, (ii) the highest probability is for the target category identified in the sampled auto-labeled training example, or (iii) both, the system trains the neural network on the sampled auto-labeled training example (step 508).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining a plurality of unlabeled text inputs for a text classification task, each unlabeled text input comprising a respective sequence of text tokens, and the text classification task requiring classifying input text inputs into a plurality of categories;

generating a plurality of auto-labeled training examples for the text classification task, wherein each auto-labeled training example comprises a respective text input and identifies a respective target category from the plurality of categories for the respective text input, the generating comprising:

selecting, as context text inputs, one or more of the unlabeled text inputs;

generating an input sequence of text tokens that includes (i) the one or more context text inputs and (ii) a text label that identifies a respective one of the plurality of categories;

processing, using a pre-trained language model neural network, the input sequence to generate an output sequence of text token; and generating an auto-labeled training example that (i) includes, as the respective text input in the training example, the output sequence generated by the pre-trained language model neural network by processing the input sequence that includes the text label; and (ii) identifies, as the respective target category for the output sequence, the respective category identified by the text label in the input sequence that was provided as input to the pre-trained language model neural network; and training a task neural network to perform the text classification task on labeled training data that comprises the auto-labeled training examples, wherein the training comprises training the task neural network to predict, for each auto-labeled training example and by processing the output sequence generated as output by the pre-trained language model neural network, the respective category identified by the text label provided as input to the pre-trained language model neural network.

2. The method of claim 1, wherein the labeled training data further comprises a plurality of manually-labeled training examples for the text classification task.

3. The method of claim 1, wherein the task neural network has, prior to the training on the labeled training data, been pre-trained on unsupervised training data, and wherein training the task neural network comprises fine-tuning the task neural network on the labeled training data.

4. The method of claim 1, wherein training the task neural network comprises training the task neural network over a sequence of a plurality of training steps, and wherein the training comprises, at a particular training step:

sampling an auto-labeled training example;

processing the text input in the sampled auto-labeled training example using the task neural network to generate a probability distribution over the plurality of categories;

determining that (i) a highest probability in the probability distribution exceeds a threshold probability for the particular training step and (ii) that the highest probability is for a category that is different than the target category identified in the sampled auto-labeled training example; and in response, refraining from training the task neural network on the sampled auto-labeled training example.

5. The method of claim 4, further comprising:

removing the sampled auto-labeled training example from the labeled training data such that the sampled auto-labeled training example is not used at any subsequent training steps.

6. The method of claim 4, wherein each training step has the same threshold probability.

7. The method of claim 4, wherein training steps that are earlier in the sequence have higher threshold probabilities than training steps that are later in the sequence.

8. The method of claim 1, wherein the language model neural network has been pre-trained on a language modeling task that requires, for each given unlabeled text sequence, a text sequence that followed the given unlabeled text sequence in a corresponding document.

9. The method of claim 1, the generating further comprising:

generating the text label by applying a task-specific transformation function that maps data identifying the respective category to a natural language description.

10. The method of claim 1, wherein generating a plurality of auto-labeled training examples for the text classification task comprises, for each of the plurality of categories, generating a threshold number of auto-labeled training examples that each identify the category as the respective target category for the respective text input in the auto-labeled training example.

11. A system comprising one or more computers and one or more storage devices storing instructions that when executed by the one or more computers cause the one or more computers to perform operations comprising:

obtaining a plurality of unlabeled text inputs for a text classification task, each unlabeled text input comprising a respective sequence of text tokens, and the text classification task requiring classifying input text inputs into a plurality of categories;

generating a plurality of auto-labeled training examples for the text classification task, wherein each auto-labeled training example comprises a respective text input and identifies a respective target category from the plurality of categories for the respective text input, the generating comprising:

selecting, as context text inputs, one or more of the unlabeled text inputs;

generating an input sequence of text tokens that includes (i) the one or more context text inputs and (ii) a text label that identifies a respective one of the plurality of categories;

processing, using a pre-trained language model neural network, the input sequence to generate an output sequence of text token; and generating an auto-labeled training example that (i) includes, as the respective text input in the training example, the output sequence generated by the pre-trained language model neural network by processing the input sequence that includes the text label; and (ii) identifies, as the respective target category for the output sequence, the respective category identified by the text label in the input sequence that was provided as input to the pre-trained language model neural network; and training a task neural network to perform the text classification task on labeled training data that comprises the auto-labeled training examples, wherein the training comprises training the task neural network to predict, for each auto-labeled training example and by processing the output sequence generated as output by the pre-trained language model neural network, the respective category identified by the text label provided as input to the pre-trained language model neural network.

12. The system of claim 11, wherein the labeled training data further comprises a plurality of manually-labeled training examples for the text classification task.

13. The system of claim 11, wherein the task neural network has, prior to the training on the labeled training data, been pre-trained on unsupervised training data, and wherein training the task neural network comprises fine-tuning the task neural network on the labeled training data.

14. The system of claim 11, wherein training the task neural network comprises training the task neural network over a sequence of a plurality of training steps, and wherein the training comprises, at a particular training step:

sampling an auto-labeled training example;

processing the text input in the sampled auto-labeled training example using the task neural network to generate a probability distribution over the plurality of categories;

determining that (i) a highest probability in the probability distribution exceeds a threshold probability for the particular training step and (ii) that the highest probability is for a category that is different than the target category identified in the sampled auto-labeled training example; and in response, refraining from training the task neural network on the sampled auto-labeled training example.

15. The system of claim 14, further comprising:

removing the sampled auto-labeled training example from the labeled training data such that the sampled auto-labeled training example is not used at any subsequent training steps.

16. The system of claim 14, wherein each training step has the same threshold probability.

17. The system of claim 14, wherein training steps that are earlier in the sequence have higher threshold probabilities than training steps that are later in the sequence.

18. The system of claim 11, wherein the language model neural network has been pre-trained on a language modeling task that requires, for each given unlabeled text sequence, a text sequence that followed the given unlabeled text sequence in a corresponding document.

19. The system of claim 11, the generating further comprising:

generating the text label by applying a task-specific transformation function that maps data identifying the respective category to a natural language description.

20. One or more non-transitory computer-readable media storing instructions that when executed by one or more computers cause the one or more computers to perform operations comprising:

obtaining a plurality of unlabeled text inputs for a text classification task, each unlabeled text input comprising a respective sequence of text tokens, and the text classification task requiring classifying input text inputs into a plurality of categories;

generating a plurality of auto-labeled training examples for the text classification task, wherein each auto-labeled training example comprises a respective text input and identifies a respective target category from the plurality of categories for the respective text input, the generating comprising:

selecting, as context text inputs, one or more of the unlabeled text inputs;

generating an input sequence of text tokens that includes (i) the one or more context text inputs and (ii) a text label that identifies a respective one of the plurality of categories;

processing, using a pre-trained language model neural network, the input sequence to generate an output sequence of text token; and generating an auto-labeled training example that (i) includes, as the respective text input in the training example, the output sequence generated by the pre-trained language model neural network by processing the input sequence that includes the text label; and (ii) identifies, as the respective target category for the output sequence, the respective category identified by the text label in the input sequence that was provided as input to the pre-trained language model neural network; and training a task neural network to perform the text classification task on labeled training data that comprises the auto-labeled training examples, wherein the training comprises training the task neural network to predict, for each auto-labeled training example and by processing the output sequence generated as output by the pre-trained language model neural network, the respective category identified by the text label provided as input to the pre-trained language model neural network.

* * * * *